(12) United States Patent
Nonaka et al.

(10) Patent No.: US 11,091,033 B2
(45) Date of Patent: Aug. 17, 2021

(54) VEHICLE CONTROL APPARATUS

(71) Applicants: ADVICS CO., LTD., Kariya (JP); TOYOTA JIDOSHA KABUSHIKI KAISHA, Toyota (JP)

(72) Inventors: Takashi Nonaka, Ichinomiya (JP); Jun Mizuno, Toyota (JP); Daisuke Kohara, Kariya (JP); Yuji Yoshii, Mishima (JP); Gen Inoue, Tajimi (JP); Yasushi Kobayashi, Toyota (JP); Hiroshi Omine, Nagoya (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 15/574,634

(22) PCT Filed: May 18, 2016

(86) PCT No.: PCT/JP2016/064800
§ 371 (c)(1),
(2) Date: Nov. 16, 2017

(87) PCT Pub. No.: WO2016/190201
PCT Pub. Date: Dec. 1, 2016

(65) Prior Publication Data
US 2018/0134156 A1 May 17, 2018

(30) Foreign Application Priority Data
May 22, 2015 (JP) .............................. JP2015-104612

(51) Int. Cl.
*B60K 28/16* (2006.01)
*B60T 8/175* (2006.01)
(Continued)

(52) U.S. Cl.
CPC .............. *B60K 28/16* (2013.01); *B60L 15/20* (2013.01); *B60T 8/175* (2013.01); *B60T 8/1761* (2013.01);
(Continued)

(58) Field of Classification Search
None
See application file for complete search history.

(56) References Cited

U.S. PATENT DOCUMENTS 5,219,212 A * 6/1993 Shimada ............... B60T 8/1755
188/181 A
6,002,979 A * 12/1999 Ishizu .................... B60K 28/16
701/86
(Continued)

FOREIGN PATENT DOCUMENTS

JP 2-277936 A 11/1990
JP 4-293653 A 10/1992
(Continued)

OTHER PUBLICATIONS

Extended European Search Report dated May 7, 2018 in European Patent Application No. 16799907.7, 9 pages.
(Continued)

*Primary Examiner* — Dale W Hilgendorf
*Assistant Examiner* — Alexander C. Bost
(74) *Attorney, Agent, or Firm* — Oblon, McClelland, Maier & Neustadt, L.L.P.

(57) ABSTRACT

The vehicle control apparatus is provided with a vehicle body speed deriving portion that derives a vehicle body speed of a vehicle, a wheel speed difference deriving portion that derives a wheel speed difference which is a deviation between the maximum wheel speed and the minimum wheel speed of the wheels of the vehicle, a request drive amount deriving portion that derives a request drive amount for the
(Continued)

drive source of the vehicle, a torque suppressing device that suppresses torque of a driving wheel, a traction control portion that controls the torque suppressing device and suppresses an acceleration slip of the driving wheel based on the wheel speed difference or a combination of the wheel speed difference and at least one of the vehicle body speed and the request drive amount.

15 Claims, 7 Drawing Sheets

(51) Int. Cl.
  *B60W 30/02* (2012.01)
  *F02D 29/02* (2006.01)
  *B60L 15/20* (2006.01)
  *B60T 8/1761* (2006.01)
  *B60W 30/18* (2012.01)

(52) U.S. Cl.
  CPC ...... *B60W 30/02* (2013.01); *B60W 30/18172* (2013.01); *F02D 29/02* (2013.01); *B60L 2240/461* (2013.01); *B60L 2260/26* (2013.01); *B60W 2520/14* (2013.01); *B60W 2540/103* (2013.01); *B60W 2540/18* (2013.01); *B60W 2552/15* (2020.02); *B60W 2720/26* (2013.01); *Y02T 10/72* (2013.01)

(56) References Cited

U.S. PATENT DOCUMENTS

| | | | |
|---|---|---|---|
| 6,061,621 A | 5/2000 | Sasaki | |
| 6,199,005 B1* | 3/2001 | Iwata | B60K 28/165 180/197 |
| 6,246,946 B1* | 6/2001 | Ohtsu | B60T 8/17616 280/757 |
| 6,269,297 B1* | 7/2001 | Hosomi | B60K 28/16 180/197 |
| 7,374,255 B2* | 5/2008 | Mori | B60K 23/04 180/248 |
| 2004/0041469 A1 | 3/2004 | Ishikawa et al. | |
| 2006/0037802 A1* | 2/2006 | Mori | B60W 10/119 180/233 |
| 2008/0105479 A1 | 5/2008 | Nishiike et al. | |
| 2010/0114447 A1 | 5/2010 | Moriki et al. | |
| 2010/0161188 A1* | 6/2010 | Turski | B60T 8/175 701/67 |
| 2011/0218700 A1* | 9/2011 | Mori | B60W 10/20 701/31.4 |
| 2013/0261925 A1 | 10/2013 | Kobayashi et al. | |
| 2015/0251658 A1* | 9/2015 | Kato | B60T 8/172 701/22 |
| 2015/0284005 A1* | 10/2015 | Suzuki | B60T 8/00 701/22 |
| 2016/0089982 A1* | 3/2016 | Ienaga | B60L 3/102 701/22 |
| 2016/0221446 A1* | 8/2016 | Suzuki | B60L 15/20 |
| 2016/0221468 A1* | 8/2016 | Suzuki | B60L 15/20 |
| 2017/0001646 A1* | 1/2017 | Cooke | B60W 50/082 |
| 2017/0066422 A1* | 3/2017 | Kerber | B60W 50/0098 |
| 2017/0080926 A1* | 3/2017 | Mogi | B60L 15/20 |

FOREIGN PATENT DOCUMENTS

| | | |
|---|---|---|
| JP | 9-273434 A | 10/1997 |
| JP | 2000-344083 A | 12/2000 |
| JP | 2008-111430 A | 5/2008 |
| JP | 2008-178216 A | 7/2008 |
| JP | 2012-95391 A | 5/2012 |
| JP | 2013-42599 A | 2/2013 |
| JP | 5706141 B2 | 4/2015 |

OTHER PUBLICATIONS

International Preliminary Report on Patentability dated Nov. 23, 2017 in PCT/JP2016/064800 (submitting English translation only).
International Search Report dated Aug. 23, 2016, in PCT/JP2016/064800 filed May 18, 2016.
European Office Action dated Dec. 7, 2020 in European Patent Application No. 16799907.7, 7 pages.

* cited by examiner

Fig.2

| | | JUDGEMENT | MODE SHIFTING | | | | |
|---|---|---|---|---|---|---|---|
| | | | 1 | 2 | 3 | 4 | 5 |
| ACCELERATION OPENING DEGREE (ENGINE TORQUE) | LARGE | ・SLIP ALLOWED | 1 ← | 2 | 3 | 4 | 5 |
| | MEDIUM | ・SLIP LIMITED | 1 | 2 → | 3 | 4 | 5 |
| | SMALL | ・MODE MAINTAINED | 1 | 2 | 3 | 4 | 5 |

Fig.3

| | | JUDGEMENT | MODE SHIFTING | | | | |
|---|---|---|---|---|---|---|---|
| | | | 1 | 2 | 3 | 4 | 5 |
| VEHICLE BODY SPEED | LARGE | ・SLIP ALLOWED | 1 ← | 2 | 3 | 4 | 5 |
| | SMALL | ・MODE MAINTAINED | 1 | 2 | 3 | 4 | 5 |

Fig.4

| | | JUDGEMENT | MODE SHIFTING | | | | |
|---|---|---|---|---|---|---|---|
| | | | 1 | 2 | 3 | 4 | 5 |
| VEHICLE BODY SPEED DIFFERENCE | LARGE (MIN WHEEL, LARGE) | ・MODE SHIFTING PROHIBITED | 1 | 2 | 3 | 4 | 5 |
| | LARGE (MIN WHEEL, SMALL) | ・SLIP LIMITED | 1 | 2 | 3 | 4 → | 5 |
| | SMALL (MIN WHEEL, LARGE) | ・DOES NOT SHIFT TO STRONG BRAKING SIDE | 1 ← | 2 | 3 | 4 | 5 |
| | SMALL (MIN WHEEL, SMALL) | ・MODE SHIFTING PROHIBITED | 1 | 2 | 3 | 4 | 5 |

Fig.5

| | | JUDGEMENT | MODE SHIFTING | | | | |
|---|---|---|---|---|---|---|---|
| | | | 1 | 2 | 3 | 4 | 5 |
| INCLINATION | LARGE | •DOES NOT SHIFT TO STRONG BRAKING SIDE | 1 ← | 2 | 3 | 4 | 5 |
| | SMALL | •MODE SHIFTING ALLOWABLE | 1 | 2 | 3 | 4 | 5 |
| STEERING ANGLE | STRAIGHT TRAVELLING | •MODE SHIFTING ALLOWABLE | 1 | 2 | 3 | 4 | 5 |
| | UNDER TURNING | •MODE SHIFTING PROHIBITED | 1 | 2 | 3 | 4 | 5 |
| YAW RATE | LARGE | •MODE SHIFTING PROHIBITED | 1 | 2 | 3 | 4 | 5 |
| | SMALL | •MODE SHIFTING ALLOWABLE | 1 | 2 | 3 | 4 | 5 |

Fig.6

| ACCELERATION OPENING DEGREE | | VEHICLE BODY SPEED | | | | | | | | | | | | | | | | | | | | | |
|---|---|---|---|---|---|---|---|---|---|---|---|---|---|---|---|---|---|---|---|---|---|---|---|
| | | LARGE | | | | | | | | | | | SMALL | | | | | | | | | | |
| | | WHEEL SPEED DIFFERENCE AMONG FOUR WHEELS (LARGE) | | | | | WHEEL SPEED DIFFERENCE AMONG FOUR WHEELS (SMALL) | | | | | WHEEL SPEED DIFFERENCE AMONG FOUR WHEELS (LARGE) | | | | | WHEEL SPEED DIFFERENCE AMONG FOUR WHEELS (SMALL) | | | | | |
| LARGE | MODE SHIFTING | 1 | 2 | 3 | 4 | 5 | 1 | 2 | 3 | 4 | 5 | 1 | 2 | 3 | 4 | 5 | 1 | 2 | 3 | 4 | 5 |
| | JUDGEMENT | ·MODE 2 MAINTAINED | | | | | ·SLIP ALLOWED ↓ | | | | | ·SLIP LIMITED ↑ | | | | | ·MODE 2 MAINTAINED | | | | |
| MEDIUM | MODE SHIFTING | 1 | 2 | 3 | 4 | 5 | 1 | 2 | 3 | 4 | 5 | 1 | 2 | 3 | 4 | 5 | 1 | 2 | 3 | 4 | 5 |
| | JUDGEMENT | ·MODE 2 MAINTAINED | | | | | ·MODE 2 MAINTAINED ⇒MODE SHIFTING NOT NECESSARY | | | | | ·SLIP LIMITED ↑ | | | | | ·MODE 2 MAINTAINED | | | | |
| SMALL | MODE SHIFTING | 1 | 2 | 3 | 4 | 5 | 1 | 2 | 3 | 4 | 5 | 1 | 2 | 3 | 4 | 5 | 1 | 2 | 3 | 4 | 5 |
| | JUDGEMENT | ·MODE 2 MAINTAINED | | | | | ·MODE 2 MAINTAINED ⇒MODE SHIFTING NOT NECESSARY | | | | | ·MODE 2 MAINTAINED | | | | | ·MODE 2 MAINTAINED | | | | |

VEHICLE CONTROL APPARATUS

TECHNICAL FIELD

This invention relates to a vehicle control apparatus.

BACKGROUND ART

One type of a vehicle control apparatus disclosed in Patent Literature 1 is known. As shown in FIG. 1 of the Patent Literature 1, in the vehicle control apparatus, the TRC computer 4 detects an idle rotation of a drive wheel 1 by the vehicle wheel sensor 33 and controls the actuator 3 thereby to apply a braking force to the drive wheel 1 to perform an idle rotation suppression control (traction control) and when the auxiliary transmission 6a is in a low speed gear state, the allowable slip amount of the drive wheel 1 can be reduced. In other words, the traction control is variably performed, depending on the operation of the auxiliary transmission 6a. By this vehicle control apparatus, the run-through performance on a steep slope road can be assured.

CITATION LIST

Patent Literature

[Patent Literature 1] JP 2000-344083 A

SUMMARY OF INVENTION

Technical Problem(s)

The vehicle control apparatus recited in the Patent Literature 1 needs to operate the auxiliary transmission 6a in accordance with the condition of the traveling road and in order to solve the problem, an expectation for demand that the operation burden of the driver of the vehicle has to be reduced for assuring the run-through performance on a steep sloped road has been raised.

Accordingly, this invention was made in consideration with the above-mentioned situation and the objective of the invention is to provide a vehicle control apparatus which can reduce the operation burden of the driver of the vehicle, yet assuring the run-through performance on the steep sloped road.

Solution to Problem(s)

The vehicle control apparatus according to one aspect of the invention is characterized in that the vehicle control apparatus includes a vehicle body speed deriving portion which derives a vehicle body speed of a vehicle, a wheel speed difference deriving portion which derives a wheel speed difference that is a deviation between a maximum wheel speed and a minimum wheel speed among each wheel speed of wheels of the vehicle, a request drive amount deriving portion which derives a request drive amount to a drive source of the vehicle, a torque suppressing device which suppresses torque of a drive wheel among the wheels of the vehicle, a traction control portion which controls the torque suppressing device to suppress an acceleration slip of the drive wheel based on a target slip ratio that is a target value of a slip ratio that is an acceleration slip ratio of the drive wheel relative to the vehicle body speed and a target slip ratio setting portion which sets the target slip ratio based on the wheel speed difference or a combination of the wheel speed difference and at least one of the vehicle body speed and the request drive amount.

Effect of Invention

According to the aspect of the invention above, the target slip ratio setting portion automatically sets or changes the target slip ratio based on the wheel speed difference or a combination of the wheel speed difference and at least one of the vehicle body speed and the request drive amount, which leads to an automatic and appropriate change of the target slip ratio associated with the traction control portion without driver's operation. Accordingly, in the vehicle control apparatus, the vehicle operator's burden of operation can be reduced, keeping a good run-through performance travelling on a steep sloped road.

BRIEF EXPLANATION OF ATTACHED DRAWINGS

FIG. 2 is a view explaining a relationship between the acceleration opening degree and the slip setting mode (target slip ratio);

FIG. 3 is a view explaining a relationship between the vehicle body speed and the slip setting mode (target slip ratio);

FIG. 4 is a view explaining a relationship between the wheel speed difference and the slip setting mode (target slip ratio);

FIG. 5 is a view explaining a relationship between an inclination, steering angle and yaw rate and the slip setting mode (target slip ratio);

FIG. 6 is a view explaining a relationship between the combination of the wheel speed difference, the vehicle body speed and the acceleration opening degree and the slip setting mode (target slip ratio);

EMBODIMENTS FOR IMPLEMENTING INVENTION

Figure 1:
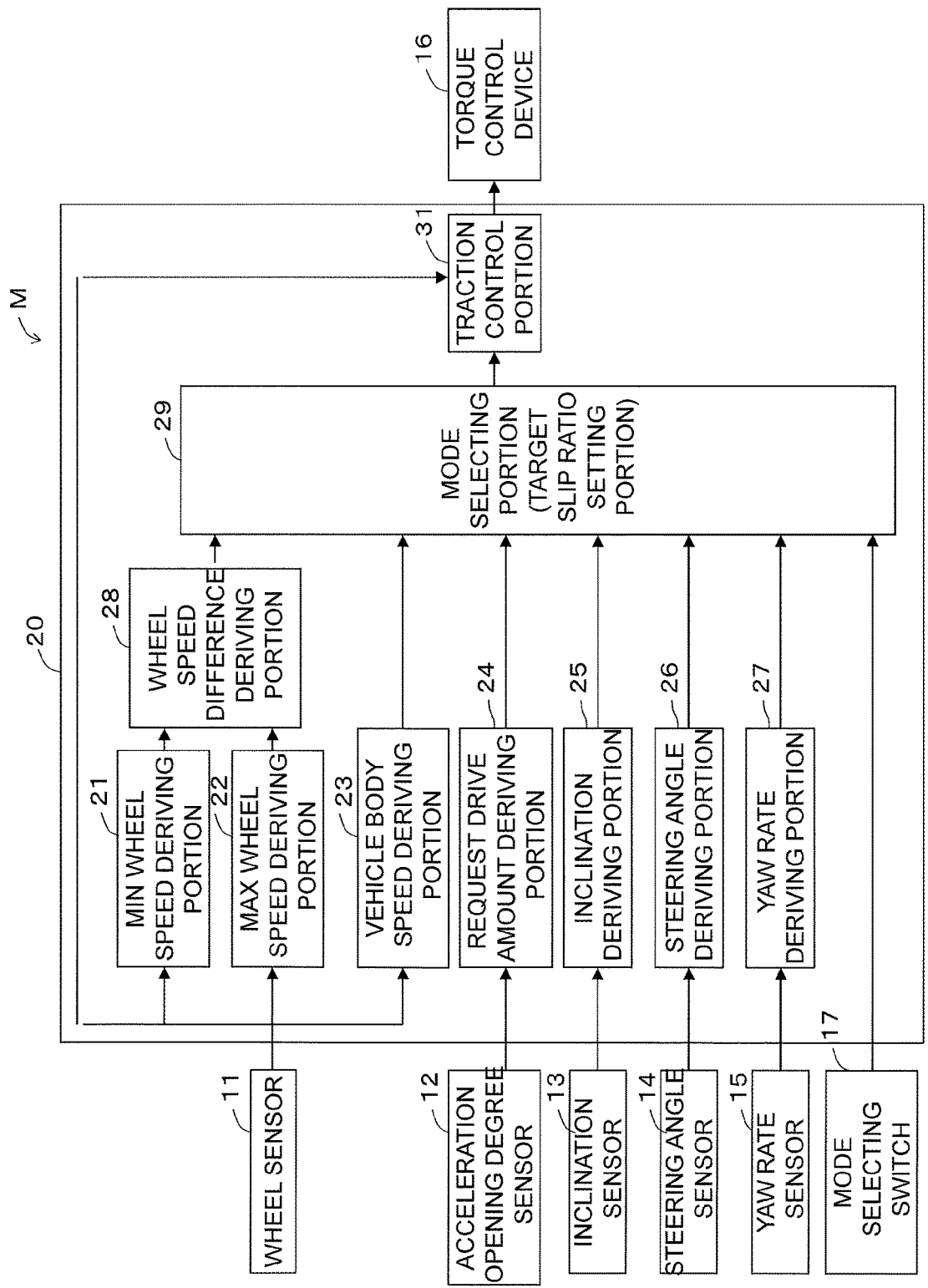
FIG. 1 is a block diagram of the vehicle control apparatus according to an embodiment of the invention.

One embodiment of the invention applied to the vehicle control apparatus associated with the invention will be explained hereinafter with reference to the attached drawings. As shown in FIG. 1, the driving vehicle M (vehicle M) is equipped with a wheel speed sensor 11, an acceleration opening degree sensor 12, an inclination sensor 13, a steering angle sensor 14, a yaw rate sensor 15, a torque suppressing device 16, a mode selecting switch 17 and a vehicle control apparatus 20. The vehicle M according to this embodiment is a four-wheel drive vehicle. It is noted however, a front wheel drive vehicle or a rear wheel drive vehicle can be applicable for the vehicle M.

The wheel speed sensor 11 is provided in a vicinity of each wheel of the vehicle M and detects the wheel speed which is the speed of the corresponding wheel of the vehicle M and outputs the detected result to the vehicle control apparatus 20.

The acceleration opening degree sensor 12 detects an operation amount (acceleration opening degree) of an accelerator pedal which is used for acceleration operation to accelerate the vehicle M. The acceleration opening degree sensor 12 outputs the detected result to the vehicle control apparatus 20. The amount of the acceleration operation of the accelerator pedal corresponds to the request drive amount to the drive source of the vehicle M (such as, for example, an engine or a motor). The drive source outputs the drive force in response to the operation amount of the accelerator pedal.

The inclination sensor 13 is installed at a vehicle body and detects the inclination of the vehicle body or an inclination relative to the travelling road surface (the inclination of the front/rear direction and the vehicle width direction). The inclination sensor 13 outputs the detected result to the vehicle control apparatus 20.

The steering angle sensor 14 is a sensor which detects the magnitude of the steering angle of a steering wheel (not shown) of the vehicle M. The detection signal of the steering angle sensor 14 is outputted to the vehicle control apparatus 20.

The yaw rate sensor 15 is a sensor which detects the yaw rate of the vehicle M. The yaw rate of the vehicle M is a change speed of the yaw angle and is represented as a rotation angular speed about a vertical axis which passes through the center of gravity of the vehicle M. The detection signal of the yaw rate sensor 15 is outputted to the vehicle control apparatus 20.

The torque suppressing device 16 is a device which suppresses the torque of the drive wheel of the vehicle M. The drive wheel is a wheel that drives the vehicle M by the drive force which is transmitted from the drive source. As the torque suppressing device 16, the engine and the motor are adopted which are used as the drive source. The drive source reduces the output to suppress the idle rotation of the drive wheel of the vehicle M.

As the torque suppressing device 16, a transmission (for example, an automatic transmission) is adopted which is provided in a torque transmitting route between the drive source and the drive wheel for changing rotation speed of the output shaft (torque) relative to the input shaft. The transmission reduces the output torque by changing speed of the input torque to suppress the idle rotation of the drive wheel of the vehicle M.

Further, as the torque suppressing device 16, a brake device can be pointed out which applies braking force to each wheel independently and actively. The brake device applies braking force to the drive wheel to suppress the idling rotation of the drive wheel of the vehicle M.

The mode selecting switch 17 is a switch which selects a slip setting mode. The slip setting mode includes first to fifth modes and one automatic mode. The first mode indicates the mode for travelling on a slippery road surface (muddy road, sandy road, deep snow road, or dirt road). The second mode indicates the mode for travelling a slippery road mixed with soil and stones (such as debris road or bush road). The third mode indicates the mode for travelling on an uneven road (mogul road, gutter, inclined road, uphill road). The fourth mode indicates the mode for travelling on the stepped road surface (mogul, V-groove, rocky place). The fifth mode indicates the mode for travelling on a road with rocks (such as rocky place). The automatic mode indicates the mode for automatically selecting an appropriate mode from the above first to fifth modes.

In the first to fifth modes, the target slip ratio is set to first to fifth slip ratios for the respective modes. The first to fifth slip ratios correspond to the target slip ratios for respective first to fifth modes. The values of the first to fifth slip ratios are becoming lower (smaller) in this order. The slip ratio is a ratio of acceleration slip of the drive wheel relative to the vehicle body speed. The target slip ratio is a target value for the slip ratio that indicates the allowable slip ratio. The target slip ratio may be set literally to the ratio relative to the vehicle body speed (for example, set to be 120%), or may be set to the speed difference relative to the vehicle body speed (for example, set to be +5 km/h), or may be set to a combination value of the ratio and the speed difference (such as 120%+5 km/h).

The vehicle control apparatus 20 includes a MIN wheel speed deriving portion 21, a MAX wheel speed deriving portion 22, a vehicle body speed deriving portion 23, a request drive amount deriving portion 24, an inclination deriving portion 25, a steering angle deriving portion 26, a yaw rate deriving portion 27, a wheel speed difference deriving portion 28, a target slip ratio setting portion 29 and a traction control portion 31.

The MIN wheel speed deriving portion 21 obtains each wheel speed of four wheels from the wheel speed sensor 11 of the vehicle M and selects a minimum wheel speed among each wheel speed of the four wheels to derive the minimum wheel speed (MIN wheel speed). The MAX wheel speed deriving portion 22 obtains each wheel speed of four wheels from the wheel speed sensor 11 of the vehicle M and selects a maximum wheel speed among each wheel speed of the four wheels to derive the maximum wheel speed (MAX wheel speed). The vehicle body speed deriving portion 23 obtains each wheel speed of four wheels from the wheel speed sensor 11 of the vehicle M and derives a vehicle body speed based on for example, the lowest wheel speed MIN wheel speed, the second lowest wheel speed MEDL wheel speed, or a wheel speed of a driven wheel when the vehicle M is equipped with the driven wheel to which the drive force is not transmitted. The vehicle body speed deriving portion 23 may obtain the vehicle speed from a vehicle speed sensor (not shown) which is provided separately. For example, the vehicle speed detects the number of rotations of the output shaft of the automatic transmission.

The request drive amount deriving portion 24 obtains an operating amount of the accelerator pedal from the acceleration opening degree sensor 12 and derives the request drive amount based on the operating amount thereof. The inclination deriving portion 25 obtains the inclination of the vehicle body of the vehicle M from the inclination sensor 13 and derives the inclination of the travelling road surface on which the vehicle M travels. The steering angle deriving portion 26 obtains the steering angle from the steering angle sensor 14 and derives the steering angle of the vehicle M. The yaw rate deriving portion 27 obtains the detection signal from the yaw rate sensor 15 and derives the yaw rate of the vehicle M.

The wheel speed difference deriving portion 28 derives the maximum difference among each wheel speed of the four wheels as the wheel speed difference. The wheel speed difference deriving portion 28 derives the wheel speed difference based on the wheel speed difference between the MIN wheel speed and the MAX wheel speed, by inputting the MIN wheel speed from the MIN wheel speed deriving portion 21 and at the same time inputting the MAX wheel speed from the MAX wheel speed deriving portion 22.

The target slip ratio setting portion 29 inputs the selected mode selected by the mode selecting switch 17 and sets the slip ratio corresponding to the selected mode as the target slip ratio. For example, the target slip ratio setting portion 29 sets the slip ratio corresponding to the selected mode as the target slip ratio, when either one of the first to fifth modes is selected by the mode selecting switch 17. In this case, the driver of the vehicle M operates the mode selecting switch 17 to select a mode in accordance with the vehicle travelling road surface condition.

The target slip ratio setting portion 29 automatically sets the mode based on either one of the wheel speed difference, vehicle body speed and the request drive amount or any combination thereof when the mode is selected to the automatic mode by the mode selecting switch 17. In other words, the target slip ratio setting portion 29 sets the target slip ratio based on at least one of the wheel speed difference, vehicle body speed and the request drive amount or any combination thereof.

In more detail, the target slip ratio setting portion 29 inputs the wheel speed difference from the wheel speed difference deriving portion 28, the vehicle body speed from the vehicle body speed deriving portion 23 and the request drive amount from the request drive amount deriving portion 24. Further, the target slip ratio setting portion 29 inputs the inclination of the travelling road surface from the inclination deriving portion 25, the steering angle of the vehicle M from the steering angle deriving portion 26 and the yaw rate of the vehicle M from the yaw rate deriving portion 27. The target slip ratio setting portion 29 sets the target slip ratio from at least any one of the wheel speed difference, the vehicle body speed and the request drive amount. It is preferable for the target slip ratio setting portion 29 to set the target slip ratio further considering the inclination of the travelling road surface, the steering angle of the vehicle M and the yaw rate of the vehicle M.

The target slip ratio setting portion 29 sets the target slip ratio in response to the acceleration opening degree (request drive amount) as shown in FIG. 2. The target slip ratio setting portion 29 raises the value of the target slip ratio when the acceleration opening degree is large. For example, when the acceleration opening degree is equal to or more than a first acceleration opening degree threshold value (corresponding to the first request drive amount threshold value), the target slip ratio setting portion 29 judges that the acceleration opening degree is large and the slip setting mode is shifted (changed) from the second mode which is defined to be the default mode to the first mode which target slip ratio is higher than that of the second mode. Raising the target slip ratio means that the slipping (idle rotation) of the drive wheel is allowed. Raising the target slip ratio when the acceleration opening degree is large means that the driver of the vehicle intends to accelerate the vehicle speed to allow the wheel to be slipped.

The target slip ratio setting portion 29 lowers the target slip ratio when the acceleration opening degree is a medium value. For example, the target slip ratio setting portion 29 judges that the acceleration opening degree is medium when the acceleration opening degree is smaller than the first acceleration opening degree threshold value, but is larger than a second acceleration opening degree threshold value and the slip setting mode is shifted (changed) from the second mode which is defined to be the default mode to the third mode which target slip ratio is smaller than that of the second mode. Lowering the target slip ratio means that the slipping (idle rotation) of the drive wheel is limited (suppressed). Lowering the target slip ratio when the acceleration opening degree is medium means that the driver of the vehicle tries to decide whether the vehicle speed should be accelerated or decelerated or be maintained to the current speed to limit the wheel to be slipped.

The target slip ratio setting portion 29 maintains the target slip ratio to the current value when the acceleration opening degree is small. For example, the target slip ratio setting portion 29 judges that the acceleration opening degree is small when the acceleration opening degree is smaller than the second acceleration opening degree threshold value. The slip setting mode is maintained to the present (current) mode. The driver of the vehicle maintains the slip setting mode to the current mode when the acceleration opening degree is small, since the driver does not positively intend to accelerate the vehicle.

Further, the target slip ratio setting portion 29 sets the target slip ratio in response to the vehicle body speed, as shown in FIG. 3. The target slip ratio setting portion 29 raises the target slip ratio when the vehicle body speed is large. For example, the target slip ratio setting portion 29 judges that the vehicle body speed is large when the vehicle body speed is larger than a first vehicle body speed threshold value. The slip setting mode is shifted (changed) from the second mode which is defined to be the default mode to the first mode which target slip ratio is higher than that of the second mode. It is noted that the target slip ratio is raised when the vehicle body speed is large. This is because the vehicle M is travelling forward (or backward) smoothly and the possibility of travelling on the rocky road surface is low and a slip is intended to be generated when the driver accelerates the vehicle under such condition.

The target slip ratio setting portion 29 maintains the target slip ratio at the current value when the vehicle body speed is small. For example, the target slip ratio setting portion 29 judges that the vehicle body speed is small when the vehicle body speed is smaller than the first vehicle body speed threshold value. The slip setting mode is maintained to the current mode. It is noted that the target slip ratio is maintained to the current target slip ratio when the vehicle body speed is small. This is because the driver of the vehicle M intends to travel slowly or the vehicle M is travelling immediately after the start-up, or the vehicle is being stuck.

Further, the target slip ratio setting portion 29 sets the target slip ratio in response to the wheel speed difference as shown in FIG. 4. The target slip ratio setting portion 29 lowers the target slip ratio when the wheel speed difference is large. For example, the target slip ratio setting portion 29 judges that the wheel speed difference is large when the wheel speed difference is larger than a first wheel speed difference threshold value. The slip setting mode is shifted (changed) from the second mode which is defined to be the default mode to the third mode and thereafter which target slip ratio is lower than that of the second mode. It is noted that the target slip ratio is lowered means that the slipping (idling) of the drive wheel is limited (suppressed). It is also noted that the target ratio is lowered when the wheel speed difference is large. This is because the drive wheel which wheel speed is larger than the others is floating and therefore slipping needs to be limited. However, when the MIN wheel speed is large, the shifting of the slip setting mode is prohibited. Under such condition, since the vehicle body speed is large, even if a wheel of the vehicle M is floating, the vehicle can travel with a constant speed, and thus the shifting of the slip setting mode is not necessary.

The target slip ratio setting portion 29 raises the target slip ratio when the wheel speed difference is small (the target slip ratio is not shifted to the lower side or strong braking side). For example, the target slip ratio setting portion 29 judges that the wheel speed difference is small when the wheel speed difference is smaller than a first wheel speed difference threshold value. The slip setting mode is shifted (changed) from the second mode which is defined to be the default mode to the first mode which target slip ratio is higher than that of the second mode. It is noted that setting the target slip ratio to a high value means that the slipping (idling) of the drive wheel is allowed. It is also noted that the when the wheel speed difference is small, the target slip ratio is raised. This is because the vehicle body speed is large due to the smaller wheel speed difference, the vehicle is considered to be travelling on a flat road surface without an extremely large unevenness on the road surface and under such condition, the slipping of the wheel is allowed so that the driver of the vehicle M can easily accelerate the vehicle. However, when the MIN wheel speed is small, the shifting of the slip setting mode is prohibited. This is because in such situation, the vehicle is travelling immediately after the start-up, with a very slow vehicle body speed and accordingly, the road surface condition and the intention of the driver are not clear.

Further, the target slip ratio setting portion 29 sets the target slip ratio in response to the inclination (particularly up-hill road) as shown in FIG. 5. The target slip ratio setting portion 29 raises the target slip ratio when the inclination is large (not shifted to the lower target slip ratio side or not shifted to a strong braking side). For example, the target slip ratio setting portion 29 judges that the inclination is large when the inclination is larger than a first inclination threshold value. The slip setting mode is shifted (changed) from the second mode which is defined to be the default mode to the first mode and thereafter which target slip ratio is higher than that of the second mode. It is noted that the reason why the target slip ratio is raised when the inclination is large is that the vehicle is travelling on the up-hill road under such situation and the driver does not want to operate too much braking.

On the other hand, when the inclination is small, the slip setting mode can be shifted by the target slip ratio setting portion 29. For example, the target slip ratio setting portion 29 judges that the inclination is small when the inclination is smaller than the first inclination threshold value.

As shown in FIG. 5, the target slip ratio setting portion 29 judges whether or not the target slip ratio can be set in response to the steering angle. The target slip ratio setting portion 29 can change the target slip ratio when the steering angle is small (when the vehicle M travels straight). In other words, the slip setting mode can be shifted. For example, the target slip ratio setting portion 29 judges that the steering angle is small when the steering angle is smaller than a steering angle threshold value.

On the other hand, the target slip ratio setting portion 29 prohibits the changing of target slip ratio when the steering angle is large (when the vehicle M is turning). In other words, the shifting of the slip setting mode is prohibited. For example, the target slip ratio setting portion 29 judges that the steering angle is large when the steering angle is larger than the steering angle threshold value. It is noted that the reason why the shifting of the target slip ratio is prohibited when the steering angle is large is that the driver is trying to find out the road condition when the steering wheel is operated and accordingly, it is preferable to maintain the current setting mode not to change the drive condition.

Further, as shown in FIG. 5, the target slip ratio setting portion 29 judges whether or not the target slip ratio can be set in response to the yaw rate. The target slip ratio setting portion 29 can change the target slip ratio when the yaw rate is small (when the vehicle M is not rotating about the center of gravity of the vehicle M). In other words, the slip setting mode can be shifted. For example, the target slip ratio setting portion 29 judges that the yaw rate is small when the yaw rate is smaller than a yaw rate threshold value.

On the other hand, the target slip ratio setting portion 29 prohibits the change of target slip ratio when the yaw rate is large (when the vehicle M is rotating about the center of gravity of the vehicle M, for example, in the case of only the rear wheels being skidding). In other words, the shifting of the slip setting mode is prohibited. For example, the target slip ratio setting portion 29 judges that the yaw rate is large when the yaw rate is larger than the yaw rate threshold value. It is noted that the reason why the shifting of the target slip ratio is prohibited when the yaw rate is large is that it is preferable to maintain the current setting mode when only the rear wheels are skidding.

Further, as shown in FIG. 6, the target slip ratio setting portion 29 sets the target slip ratio in response to the combination of the wheel speed difference, the vehicle body speed and the request drive amount. In detail, the target slip ratio setting portion 29 maintains the slip setting mode at the second mode which is the default mode of the slip setting mode when the acceleration opening degree is large, the vehicle body speed is large and the wheel speed difference is large. The target slip ratio setting portion 29 maintains the second slip ratio which corresponds to the second mode of the target slip ratio.

The target slip ratio setting portion 29 maintains the slip setting mode at the second mode which is the default mode of the slip setting mode when the acceleration opening degree is medium, the vehicle body speed is large and the wheel speed difference is large. The target slip ratio setting portion 29 maintains the slip setting mode to the second mode which is the default mode of the slip setting mode when the acceleration opening degree is small, the vehicle body speed is large and the wheel speed difference is large.

As explained, the target slip ratio setting portion 29 judges whether the magnitude of the acceleration opening degree is large, medium or small comparing the acceleration opening degree with the first and the second acceleration opening degree threshold values. As explained, the target slip ratio setting portion 29 judges whether the magnitude of the vehicle body speed is large or small comparing the vehicle body speed with the first vehicle body speed threshold value. The target slip ratio setting portion 29 judges whether the magnitude of the wheel speed difference is large or small comparing the wheel speed difference with the first wheel speed difference threshold value.

Further, the target slip ratio setting portion 29 changes the slip setting mode to a side where the target slip ratio becomes high when the acceleration opening degree is large, the vehicle body speed is large and the wheel speed difference is small. The target slip ratio setting portion 29 raises the target slip ratio. For example, the target slip ratio setting portion 29 changes the slip setting mode to the first mode from the second mode and changes (increases) the target slip ratio to the first slip ratio which corresponds to the first mode. The setting of the target slip ratio to a high value means that the slipping (idling) of the drive wheel is allowed.

The target slip ratio setting portion 29 maintains the slip setting mode at the second mode which is the default mode of the slip setting mode when the acceleration opening degree is medium, the vehicle body speed is large and the wheel speed difference is small. This is because there is no need for shifting the slip setting mode under such situation. The target slip ratio setting portion 29 maintains the slip setting mode to the second mode which is the default mode of the slip setting mode when the acceleration opening degree is small, the vehicle body speed is large and the wheel speed difference is small. This is because there is no need for shifting the slip setting mode under such situation.

Further, the target slip ratio setting portion 29 changes the slip setting mode to a side where the target slip ratio becomes low when the acceleration opening degree is large, the vehicle body speed is small and the wheel speed difference is large. The target slip ratio setting portion 29 lowers the target slip ratio. For example, the target slip ratio setting portion 29 changes the target slip setting mode to the third mode and thereafter from the second mode and changes (lowers) the target slip ratio to the slip ratio which respectively correspond to the third mode and the modes thereafter (from the third through fifth slip ratios). The setting of the target slip ratio to a low value means that the slipping (idling) of the drive wheel is limited (suppressed).

The target slip ratio setting portion 29 changes the slip setting mode to a side where the target slip ratio becomes low when the acceleration opening degree is medium, the vehicle body speed is small and the wheel speed difference is large. The target slip ratio setting portion 29 lowers the target slip ratio as similar to the above. The target slip ratio setting portion 29 maintains the slip setting mode to the second mode which is the default mode of the slip setting mode when the acceleration opening degree is small, the vehicle body speed is small and the wheel speed difference is large. Under such condition, the shifting of the slip setting mode is not necessary.

Further, the target slip ratio setting portion 29 maintains the slip setting mode to the second mode which is the default mode of the slip setting mode when the acceleration opening degree is large, the vehicle body speed is small and the wheel speed difference is small. The target slip ratio setting portion 29 maintains the target slip ratio to the second slip ratio which agrees with (corresponds to) the target slip ratio of the second mode.

The target slip ratio setting portion 29 maintains the slip setting mode to the second mode which is the default mode of the slip setting mode when the acceleration opening degree is medium, the vehicle body speed is small and the wheel speed difference is small. The target slip ratio setting portion 29 maintains the slip setting mode to the second mode which is the default mode of the slip setting mode when the acceleration opening degree is small, the vehicle body speed is small and the wheel speed difference is small.

The traction control portion 31 suppresses the acceleration slip of the drive wheel by controlling the torque suppressing device 16 based on the target slip ratio which is the target value of the ratio of the acceleration slip of the drive wheel relative to the vehicle body speed. The traction control portion 31 calculates the acceleration slip ratio of the drive wheel relative to the vehicle body speed from the inputted vehicle body speed and each wheel speed, respectively. The traction control portion 31 calculates the suppression torque amount so that the calculated acceleration slip ratio can fall within the target slip ration inputted from the target slip ratio setting portion 29 and outputs the calculated suppression torque amount to the torque suppressing device 16.

Figure 7:
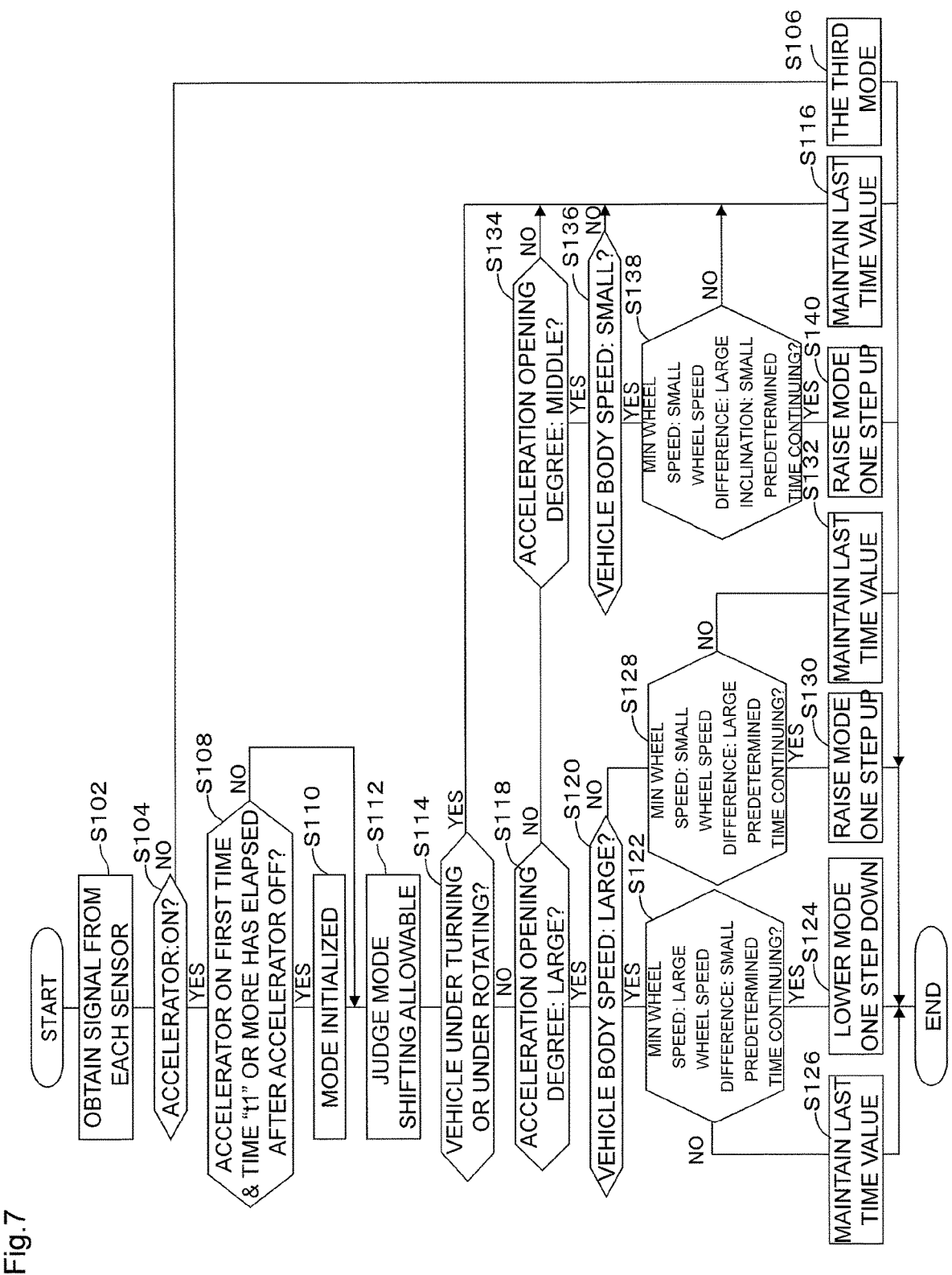
FIG. 7 is a flowchart of the control program executed by the vehicle control apparatus shown in FIG. 1.

Further, the operation of the above explained vehicle control apparatus 20 will be explained with reference to the flowchart shown in FIG. 7. The vehicle control apparatus 20 executes the program which corresponds to the flowchart in FIG. 7 repeatedly every predetermined short period of time. The vehicle control apparatus 20 obtains the detection signal from each sensor at the step S102. The vehicle control apparatus 20 judges whether the accelerator is ON or not at the step S104. If the accelerator is not ON, the vehicle control apparatus 20 judges "NO" at the step S104 and at the step S106, the vehicle control apparatus 20 sets the slip setting mode to the third mode automatically.

On the other hand, if the accelerator is ON, the vehicle control apparatus 20 judges "YES" at the step S104 and judges whether the accelerator is ON for the first time or not and at the same time judges whether the time from the accelerator being OFF has elapsed a predetermined time "t1" or not at the step S108. The predetermined time "t1" is set for example, to the time corresponding to the accelerator being OFF when the driver of the vehicle repeats ON/OFF operation of the accelerator in a short time to try to find out the road surface condition. When the accelerator is ON for the first time (accelerator ON starts) and at the same time when the time "t1" or more has elapsed after the accelerator being OFF, the vehicle control apparatus 20 judges "YES" at the step S108 and automatically sets (initialize) the slip setting mode to the second mode at the step S110. The second mode is the default mode of the slip setting mode. When the accelerator ON is not for the first time (i.e., accelerator ON being continuing), the vehicle control apparatus 20 judges "NO" at the step S108 and judges that shifting of the slip setting mode is allowable at the step S112.

The vehicle control apparatus 20 judges whether or not the vehicle M is turning or whether or not the vehicle M is rotating based on the steering angle and the yaw rate at the step S114. It is noted that the meaning of the vehicle M being rotating is that the vehicle M is rotating about the center of gravity of the vehicle M, for example, only the rear wheels are skidding. When the vehicle M is turning, or rotating, the vehicle control apparatus 20 judges "YES" at the step S114 and prohibits the shifting of the mode as explained and maintains the current mode. In other words, the vehicle control apparatus 20 maintains the slip setting mode at the mode set at the last time control cycle at the step S116. When the vehicle M is not turning and is not rotating either, the vehicle control apparatus 20 judges "NO" at the step S114 and advances the program to the step S118 and thereafter. Similar to the target slip ratio setting portion 29 as explained above, the vehicle control apparatus 20 automatically sets the slip setting mode based on the wheel speed difference, vehicle body speed and the request drive amount or any combination thereof. (automatically sets the target slip ratio).

The vehicle control apparatus 20 judges "YES" at the steps S118, S120 and S122 when the condition that the acceleration opening degree is large, the vehicle body speed is large, the MIN wheel speed is large and the wheel speed difference is small continues for a predetermined time T and changes the slip setting mode to the side where the target slip ratio is raised (i.e., lowers the mode at least one step down at the step S124).

The vehicle control apparatus 20 judges "YES", "YES" and "NO" at the steps S118, S120 and S122, respectively when the condition that the acceleration opening degree is large, the vehicle body speed is large but MIN wheel speed is large and the wheel speed difference is small does not continue for the predetermined time T and maintains the slip setting mode at the mode set at the last time control cycle (step S126).

The vehicle control apparatus 20 judges "YES", "NO" and "YES" at the steps S118, S120 and S128, respectively when the condition that the acceleration opening degree is large, the vehicle body speed is small, MIN wheel speed is small and the wheel speed difference is large continues for the predetermined time T and changes the slip setting mode to the side where the target slip ratio is lowered (i.e., raises the mode at least one step up at the step S130).

The vehicle control apparatus 20 judges "YES", "NO" and "NO" at the steps S118, S120 and S128, respectively when the condition that the acceleration opening degree is large, the vehicle body speed is small but MIN wheel speed is small and the wheel speed difference is large does not continue for the predetermined time T and maintains the slip setting mode at the mode set at the last time control cycle (step S132).

The vehicle control apparatus 20 judges "NO", "YES", "YES" and "YES" at the steps S118, S134, S136 and S138, respectively when the condition that the acceleration opening degree is medium, the vehicle body speed is small, MIN wheel speed is small, the wheel speed difference is large and the inclination is small continues for the predetermined time T and changes the slip setting mode to the side where the target slip ratio is lowered (i.e., raises the mode at least one step up at the step S140).

The vehicle control apparatus 20 judges "NO" and "NO" at the steps S118 and S134, respectively when the acceleration opening degree is small and maintains the slip setting mode at the mode set at the last time control cycle, (step S116).

The vehicle control apparatus 20 judges "NO", "YES" and "NO" at the steps S118, S134 and S136, respectively when the acceleration opening degree is medium and the vehicle body speed is large and maintains the slip setting mode at the mode set at the last time control cycle (step S116).

The vehicle control apparatus 20 judges "NO", "YES", "YES" and "NO" at the steps S118, S134, S136 and S138, respectively when the condition that the acceleration opening degree is medium, the vehicle body speed is small, but MIN wheel speed is small, the wheel speed difference is large and the inclination is small does not continue for the predetermined time T and maintains the slip setting mode to the mode set at the last time control cycle (step S116).

Figure 8:
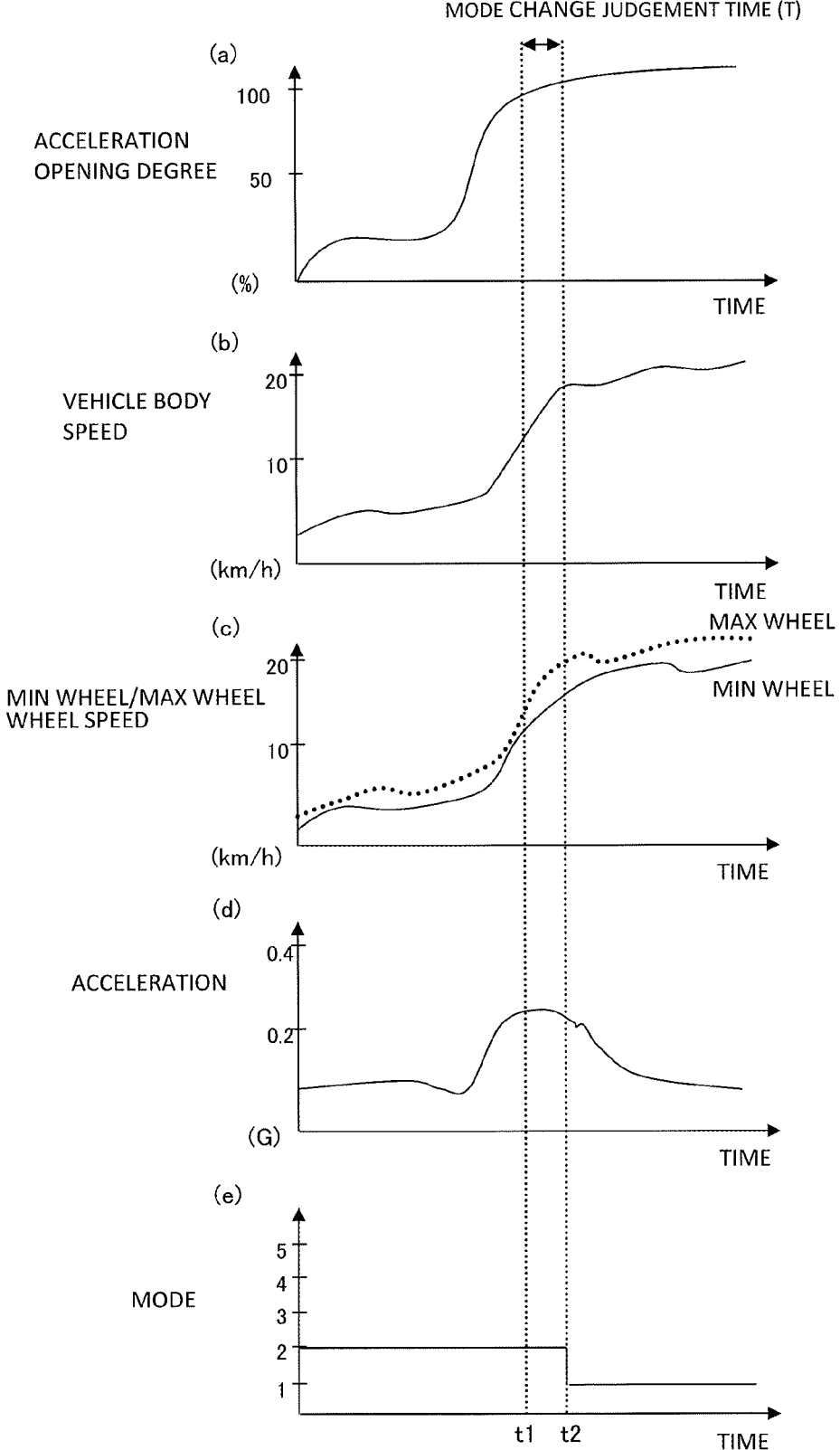
FIG. 8 is a time chart showing an example when the slip mode is shifted to the side where a slip is allowed.

Further, the explanation of the shifting of the mode to the side where the slip is allowed will be made with reference to the time chart shown in FIG. 8. The mode shifting from the second mode to the first mode will be explained. In FIG. 8, from top to bottom, the acceleration opening degree, the vehicle body speed, wheel speed, acceleration G (deceleration) and the slip setting mode are shown.

As shown in FIG. 8, the condition that the acceleration opening degree is large, the vehicle body speed is large, MIN wheel speed is large and the wheel speed difference is small continues for the predetermined time T which is the time from the time "t1" to the time "t2". The predetermined time T is the time necessary for judging the mode change judgment.

The vehicle control apparatus 20 changes the slip setting mode to the side where the target slip ratio is raised when the acceleration opening degree is large, the vehicle body speed is large and the wheel speed difference is small. In more detail, the vehicle control apparatus 20 changes the slip setting mode to the side where the target slip ratio is raised when the condition that the acceleration opening degree is large, the vehicle body speed is large, the MIN wheel speed is large and the wheel speed difference is small continues for the predetermined time T (i.e., lowers the mode at least one step down at the step S124).

Figure 9:
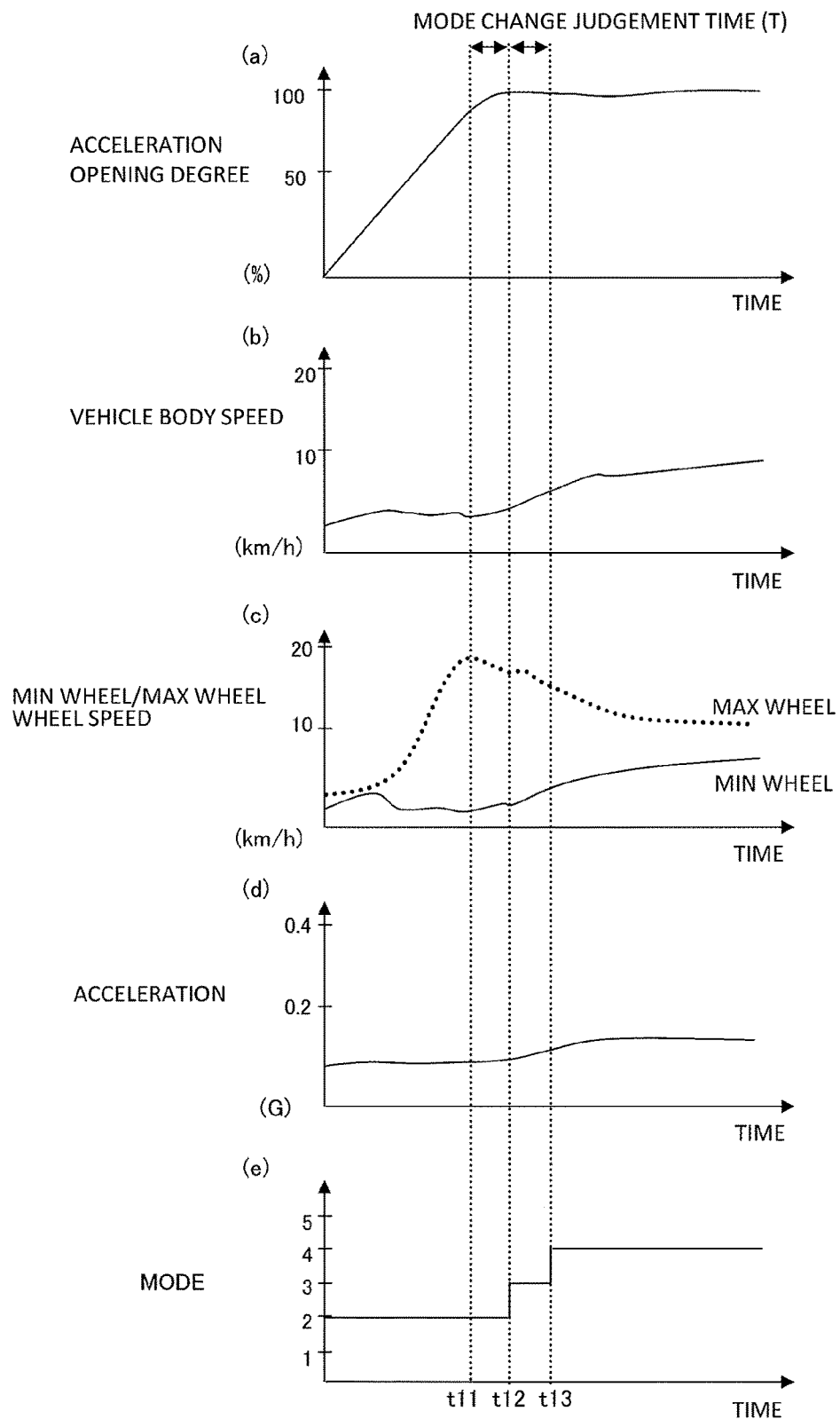
FIG. 9 is a time chart showing an example when the slip mode is shifted to the side where a slip is limited.

Further, the explanation of the shifting of the mode to the side where the slip is suppressed will be made with reference to the time chart shown in FIG. 9. The mode shifting from the second mode to the fourth mode will be explained. In FIG. 9, from top to bottom, the acceleration opening degree, the vehicle body speed, wheel speed, acceleration G (deceleration) and the slip setting mode are shown.

As shown in FIG. 9, the condition that the acceleration opening degree is large, the vehicle body speed is small, MIN wheel speed is small and the wheel speed difference is large continues for the predetermined time T which is the time from the time "t11" to the time "t12" and the predetermined time T which is the time from the time "t12" to the time "t13".

The vehicle control apparatus 20 changes the slip setting mode to the side where the target slip ratio is lowered when the acceleration opening degree is large, the vehicle body speed is small and the wheel speed difference is large. In more detail, the vehicle control apparatus 20 changes the slip setting mode to the side where the target slip ratio is lowered when the condition that the acceleration opening degree is large, the vehicle body speed is small, the MIN wheel speed is small and the wheel speed difference is large continues for the predetermined time T (i.e., raises the mode at least one step up at the step S130). The vehicle control apparatus 20 changes the slip setting mode from the second mode to the third mode at the time "t12" and changes the slip setting mode from the third mode to the fourth mode at the time "t13".

As explained above, the vehicle control apparatus 20 includes a vehicle body speed deriving portion 23 which derives the vehicle body speed of the vehicle M, a wheel speed difference deriving portion 28 which derives a wheel speed difference that is a deviation between a maximum wheel speed and a minimum wheel speed among each wheel speed of wheels of the vehicle M, a request drive amount deriving portion 24 which derives a request drive amount to a drive source of the vehicle, a torque suppressing device 16 which suppresses torque of a drive wheel of the wheels of the vehicle M, a traction control portion 31 which controls the torque suppressing device 16 to suppress an acceleration slip of the drive wheel based on a target slip ratio that is a target value of a slip ratio that is an acceleration slip ratio of the drive wheel relative to the vehicle body speed and a target slip ratio setting portion 29 which sets the target slip ratio based on at least one of the wheel speed difference, the vehicle body speed and the request drive amount or any combination thereof.

According to the structure above, the target slip ratio setting portion 29 automatically sets or changes the target slip ratio based on at least one of the wheel speed difference, the vehicle body speed and the request drive amount or a combination thereof. This structure leads to an automatic and appropriate change of the target slip ratio associated with the traction control portion 31 without driver's operation. Accordingly, in the vehicle control apparatus 20, the vehicle operator's burden of operation can be reduced, keeping a good run-through performance travelling on a steep sloped road.

Further, the target slip ratio setting portion 29 raises the target slip ratio when the acceleration opening degree (request drive amount) is larger than the first acceleration opening degree threshold value (first request drive amount threshold value) and lowers the target slip ratio when the acceleration opening degree is smaller than the first acceleration opening degree threshold value. Thus, the target slip ratio can be automatically changed based on the request drive amount.

Further, the target slip ratio setting portion 29 raises the target slip ratio when the vehicle body speed is larger than the first vehicle body speed threshold value. Thus, the target slip ratio can be automatically changed based on the vehicle body speed.

Further, the target slip ratio setting portion 29 lowers the target slip ratio when the wheel speed difference is larger than the first wheel speed difference threshold value and raises the target slip ratio when the wheel speed difference is smaller than the first wheel speed difference threshold value. Thus, the target slip ratio can be automatically changed based on the wheel speed difference.

Further, the target slip ratio setting portion 29 raises the target slip ratio when the acceleration opening degree (request drive amount) is larger than the first acceleration opening degree threshold value (second request drive amount threshold value), the vehicle body speed is larger than the first vehicle body speed threshold value (second vehicle body speed threshold value) and the wheel speed difference is smaller than the first wheel speed difference threshold value (second wheel speed difference threshold value). Thus, the target slip ratio can be automatically and at the same time properly changed based on a combination of the wheel speed difference, the vehicle body speed and the request drive amount. It is noted that the second request drive amount threshold value can be set differently from the value of the first acceleration opening degree threshold value. Also, it is noted that the second vehicle body speed threshold value may be differently set from the value of the first vehicle body speed threshold value. It is further noted that the second wheel speed difference threshold value may be set differently from the value of the first wheel speed difference threshold value.

Further, the target slip ratio setting portion 29 lowers the target slip ratio when the acceleration opening degree (request drive amount) is larger than the first acceleration opening degree threshold value (third request drive amount threshold value), the vehicle body speed is smaller than the first vehicle body speed threshold value (third vehicle body speed threshold value) and the wheel speed difference is larger than the first wheel speed difference threshold value (third wheel speed difference threshold value). Thus, the target slip ratio can be automatically and at the same time properly changed based on the combination of the wheel speed difference, the vehicle body speed and the request drive amount. It is noted that the third request drive amount threshold value can be set differently from the value of the first acceleration opening degree threshold value. Also, it is noted that the third vehicle body speed threshold value may be differently set from the value of the first vehicle body speed threshold value. It is further noted that the third wheel speed difference threshold value may be set differently from the value of the first wheel speed difference threshold value.

In the embodiment explained above, the target slip ratio setting portion 29 may set the target slip ratio based on the selected two items selected from the wheel speed difference, the vehicle body speed and the request drive amount. Further, it is preferable that the target slip ratio setting portion 29 sets the target slip ratio based on the two items which at least include the request drive amount.

The invention claimed is:
1. A vehicle control apparatus comprising:
a vehicle body speed deriving portion which derives a vehicle body speed of a vehicle;
a wheel speed difference deriving portion which derives a wheel speed difference that is a deviation between a maximum wheel speed and a minimum wheel speed among each wheel speed of wheels of the vehicle;
a drive amount request deriving portion which derives a drive amount request to a drive source of the vehicle;
a torque suppressing device which suppresses torque of a drive wheel among the wheels of the vehicle;
a traction control portion which controls the torque suppressing device to suppress an acceleration slip of the drive wheel based on a target slip ratio that is a target value of a slip ratio that is an acceleration slip ratio of the drive wheel relative to the vehicle body speed; and
a target slip ratio setting portion which sets the target slip ratio based on the wheel speed difference or a combination of the wheel speed difference and at least one of the vehicle body speed and the request drive amount,
wherein the target slip ratio setting portion (i) lowers the target slip ratio when the wheel speed difference is larger than a first wheel speed difference threshold value by automatic selection of a first slip setting mode from a plurality of slip setting modes, (ii) and raises the target slip ratio when the wheel speed difference is smaller than the first wheel speed difference threshold value by automatic selection of a second slip setting mode from the plurality of slip setting modes,
wherein the first slip setting mode corresponds to a lower target slip ratio than the second slip setting mode, and
wherein shifting between the plurality of slip setting modes is prohibited in response to a determination that a predetermined condition is met, the predetermined condition being based on one of a (i) steering angle of the vehicle and (ii) yaw rate of the vehicle.

2. The vehicle control apparatus according to claim 1, wherein the target slip ratio setting portion raises the target slip ratio when the request drive amount is larger than a first request drive amount threshold value and lowers the target slip ratio when the request drive amount is smaller than the first request drive amount threshold value.

3. The vehicle control apparatus according to claim 1, wherein the target slip ratio setting portion raises the target slip ratio when the vehicle body speed is larger than a first vehicle body speed threshold value.

4. The vehicle control apparatus according to claim 1, wherein the target slip ratio setting portion raises the target slip ratio when the request drive amount is larger than a second request drive amount threshold value, when the vehicle body speed is larger than a second vehicle body speed threshold value, and when the wheel speed difference is smaller than a second wheel speed difference threshold value.

5. The vehicle control apparatus according to claim 1, wherein the target slip ratio setting portion lowers the target slip ratio when the request drive amount is larger than a third request drive amount threshold value, when the vehicle body speed is smaller than a third vehicle body speed threshold value, and when the wheel speed difference is larger than a third wheel speed difference threshold value.

6. A vehicle control apparatus comprising:
a vehicle body speed deriving portion which derives a vehicle body speed of a vehicle;
a wheel speed difference deriving portion which derives a wheel speed difference that is a deviation between a maximum wheel speed and a minimum wheel speed among each wheel speed of wheels of the vehicle;
a drive amount request deriving portion which derives a drive amount request to a drive source of the vehicle;
a traction control portion which controls a torque suppressing device, which suppresses torque of a drive wheel among the wheels of the vehicle, to suppress an acceleration slip of the drive wheel based on a target slip ratio that is a target value of a slip ratio that is an acceleration slip ratio of the drive wheel relative to the vehicle body speed; and a target slip ratio setting portion which sets the target slip ratio based on the wheel speed difference or a combination of the wheel speed difference and at least one of the vehicle body speed and the request drive amount, wherein the target slip ratio setting portion (i) lowers the target slip ratio when the wheel speed difference is larger than a first wheel speed difference threshold value by automatic selection of a first slip setting mode from a plurality of slip setting modes, (ii) and raises the target slip ratio when the wheel speed difference is smaller than the first wheel speed difference threshold value by automatic selection of a second slip setting mode from the plurality of slip setting modes, wherein the first slip setting mode corresponds to a lower target slip ratio than the second slip setting mode, and wherein shifting between the plurality of slip setting modes is prohibited in response to a determination that a predetermined condition is met, the predetermined condition being based on one of a (i) steering angle of the vehicle and (ii) yaw rate of the vehicle.

7. The vehicle control apparatus according to claim 6, wherein the target slip ratio setting portion raises the target slip ratio when the request drive amount is larger than a first request drive amount threshold value and lowers the target slip ratio when the request drive amount is smaller than the first request drive amount threshold value.

8. The vehicle control apparatus according to claim 6, wherein the target slip ratio setting portion raises the target slip ratio when the vehicle body speed is larger than a first vehicle body speed threshold value.

9. The vehicle control apparatus according to claim 6, wherein the target slip ratio setting portion raises the target slip ratio when the request drive amount is larger than a second request drive amount threshold value, when the vehicle body speed is larger than a second vehicle body speed threshold value, and when the wheel speed difference is smaller than a second wheel speed difference threshold value.

10. The vehicle control apparatus according to claim 6, wherein the target slip ratio setting portion lowers the target slip ratio when the request drive amount is larger than a third request drive amount threshold value, when the vehicle body speed is smaller than a third vehicle body speed threshold value, and when the wheel speed difference is larger than a third wheel speed difference threshold value.

11. A vehicle comprising:
the vehicle control apparatus according to claim 6; and
the torque suppressing device.

12. The vehicle control apparatus according to claim 1, wherein the vehicle body speed deriving portion derives the vehicle body speed of the vehicle as the minimum wheel speed of all the wheel speeds of the respective wheels of the vehicle.

13. The vehicle control apparatus according to claim 1, wherein the vehicle body speed deriving portion derives the vehicle body speed of the vehicle as a second lowest wheel speed of all the wheel speeds of the respective wheels of the vehicle.

14. The vehicle control apparatus of claim 1, wherein the predetermined condition specifies that the steering angle of the vehicle is larger than a steering threshold indicating that the vehicle is in a state of turning.

15. The vehicle control apparatus of claim 1, wherein the predetermined condition specifies that the yaw rate of the vehicle is larger than a yaw rate threshold indicating that the vehicle is in a state of rotating about a center of gravity of the vehicle.

* * * * *